United States Patent [19]

Kuhns et al.

[11] Patent Number: 5,716,490
[45] Date of Patent: Feb. 10, 1998

[54] METHOD AND LAMINATOR FOR RAPIDLY LAMINATING ASSORTED PLASTIC ENVELOPES HAVING DIFFERENT TEMPERATURE REQUIREMENTS

[75] Inventors: Roger J. Kuhns, Lincoln; Scott Chandler, Acton; Robert L. Nathans, Billerica, all of Mass.; Otto Zettl, Rochester, N.Y.

[73] Assignee: Avant, Incorporated, West Concord, Mass.

[21] Appl. No.: 1,678

[22] Filed: Jan. 7, 1993

[51] Int. Cl.$^6$ .................................................. B32B 31/00
[52] U.S. Cl. .................. 156/499; 156/555; 156/583.1; 100/93 RP
[58] Field of Search .................. 156/555, 583.1, 156/281, 498, 499, 908; 412/8, 37, 902; 100/93 RP, 176; 219/469, 470

[56] References Cited

U.S. PATENT DOCUMENTS

| | | | |
|---|---|---|---|
| 2,224,370 | 12/1940 | Wescott | 156/499 |
| 3,088,379 | 5/1963 | Dickinson et al. | 156/320 X |
| 3,840,420 | 10/1974 | Sarcia | 156/358 |
| 3,994,769 | 11/1976 | Gersbeck | 156/499 |
| 4,102,730 | 7/1978 | Staats | 156/499 |
| 4,310,365 | 1/1982 | Elliott et al. | 156/55 |
| 4,585,510 | 4/1986 | Hadjiskakis et al. | 156/555 |
| 4,647,332 | 3/1987 | Ranger | 156/285 |
| 4,818,168 | 4/1989 | Battisti | 412/37 |
| 5,073,076 | 12/1991 | Parkhill et al. | 412/33 |

Primary Examiner—James Sells
Attorney, Agent, or Firm—Iandiorio & Teska

[57] ABSTRACT

A low mass heater is disclosed for rapid heat-up having thin arcuate heater portions adjacent the rollers and separated therefrom by a narrow gap for injecting heat into peripheral portions of the rollers. These arcuate portions may be ductile and have slots therein for adjusting the gap, and also include finger members for self-cleaning of the rollers. A notch is formed in a heater portion for easy lamination of a perfect binder of a booklet. Also, the laminator casing is shaped in the form of a dome having air passage slots therein, which eliminates the need for a cooling fan for the electronic components of the laminator. The dome shape also provides a large sloping surface for an ergonomic control arrangement. After lamination of a first batch of plastic envelopes requiring high laminating temperatures, a second batch requiring low temperatures can be immediately laminated without waiting for cooling down of the heater, by increasing the angular drive roller velocity. The effective temperature of lamination is thus varied yet the temperature in the perfect binder slot remains constant.

16 Claims, 2 Drawing Sheets

METHOD AND LAMINATOR FOR RAPIDLY LAMINATING ASSORTED PLASTIC ENVELOPES HAVING DIFFERENT TEMPERATURE REQUIREMENTS

BACKGROUND OF THE INVENTION

The present invention relates to the field of lamination of plastic articles.

Various types of plastic articles which comprise precut envelopes or pouches for receiving indicia-bearing insert sheets therein are laminated by the application of heat and pressure thereto. Identification cards and badges, and drivers licenses are common examples of such laminations. Typically, a transparent cover sheet is coupled to a backing sheet and the indicia bearing insert sheet is positioned between the plastic cover sheet and the backing sheet and the resulting sandwich is passed through a laminator which applies heat and pressure to the envelope to produce the final laminated product. More recently, larger presentation folders are laminated in like manner whereby customized graphic indicia produced by an ordinary personal computer is laminated between a heat activatable plastic cover sheet, and half of the presentation folder. See U.S. Pat. Nos. 5,042,843 and 5,090,732 issued to Roger Kuhns et al. and assigned to Avant Inc.

So called pouch or envelope laminators are commonly used to perform lamination of these articles. They typically employ a large mass electrical heater positioned between a pair of entrance rollers and a pair of exit rollers. The entrance rollers drive the envelopes through a narrow gap formed in the electrical heater which melts the heat activatable adhesive on the inside surface of the envelopes. The heated envelopes are thereafter passed through the nip of the exit roller pair which performs the final lamination by the application of heat and pressure thereto.

Users of these machines laminate batches of various types of such envelopes, where one batch may require the use of large thick envelopes. These could be the aforesaid 8.5×11.5 inch presentation folders made of paper stock typically having a thickness of 10–12 mils, and three mils of heat-activatable plastic cover sheets attached thereto. Such a batch of presentation folders require a relatively high temperature of exposure produced by the electrical heater since the heat must penetrate the thick 10–12 mil paper presentation folder as it passes through the heater gap. After lamination of this first batch, the user may wish to laminate a second batch of wallet sized ID cards, which call for a far lower temperature of exposure, since the cards are small and thin. If these thin envelopes are merely passed through the heater just after the lamination of the relatively thick presentation folders, without waiting for a long time for the heater to cool down, the heat activatable adhesive and/or latent moisture of fresh photos would tend to boil producing encapsulated bubbling and an unsatisfactory or even ruined lamination would result.

This presents a problem to the user of the laminating machine because the cool-down interval in the above example takes thirty to forty minutes and the operator can become impatient and attempt to laminate the second batch at the higher temperature used to laminate the first batch, and the ID cards of the second match would not be properly laminated due to bubbling and the like and can even be ruined. Also, a customer of the owner of the laminator will not wish to wait a half hour required for the cooldown. This is especially the case regarding outside printing and laminating service shops. Additionally, the operator would tend to wait and waste time at the machine for it to cool/down, rather than performing another task. This costs the owner money.

BRIEF SUMMARY OF THE INVENTION

The aforesaid "cool-down" problem is solved in accordance with a preferred embodiment of the invention by driving the rollers at a high angular velocity when the aforesaid second batch of envelopes are being laminated. The reduced dwell time of the envelopes passing through the laminator will prevent the heat-activatable adhesive from over heating to spoil the laminations of the second batch. As a result, the second batch may be immediately laminated after lamination of the first batch.

Also, the aforesaid high thermal mass prior art heater is replaced by providing low mass arcuate heater portions adjacent to the rollers and separated therefrom by a narrow gap for injecting heat into peripheral portions of the rollers. The result is to sharply reduce the time required to get the heater portions up to their operating temperature upon startup. With the long startup periods of the prior art laminators, the operators tend to keep the machine up to operating temperature in the standby mode for many hours which is wasteful of energy. The thin heater portions may terminate in an inwardly extending ductile and thus bendable finger member having slots therein. The aforesaid gap may be readily adjusted along the entire length of the roller by inserting a screwdriver within the slots and twisting the screwdriver. Also, a notch is formed in a heater portion having a bow-spring microswitch therein for easy lamination of a perfect binding of a booklet, which is normally exposed to a constant temperature regardless of changes in the effective temperatures required for lamination of various batches of pouches. Also, the laminator casing is shaped in the form of a dome having air passage slots therein, which eliminates the need for a cooling fan for the electronic components of the laminator.

BRIEF DESCRIPTION OF THE DRAWINGS

Other objects, features and advantages of the present invention will become apparent upon study of the following description taken in conjunction with the drawings in which.

DETAILED DESCRIPTION OF PREFERRED EMBODIMENTS OF THE INVENTION

Figure 1:
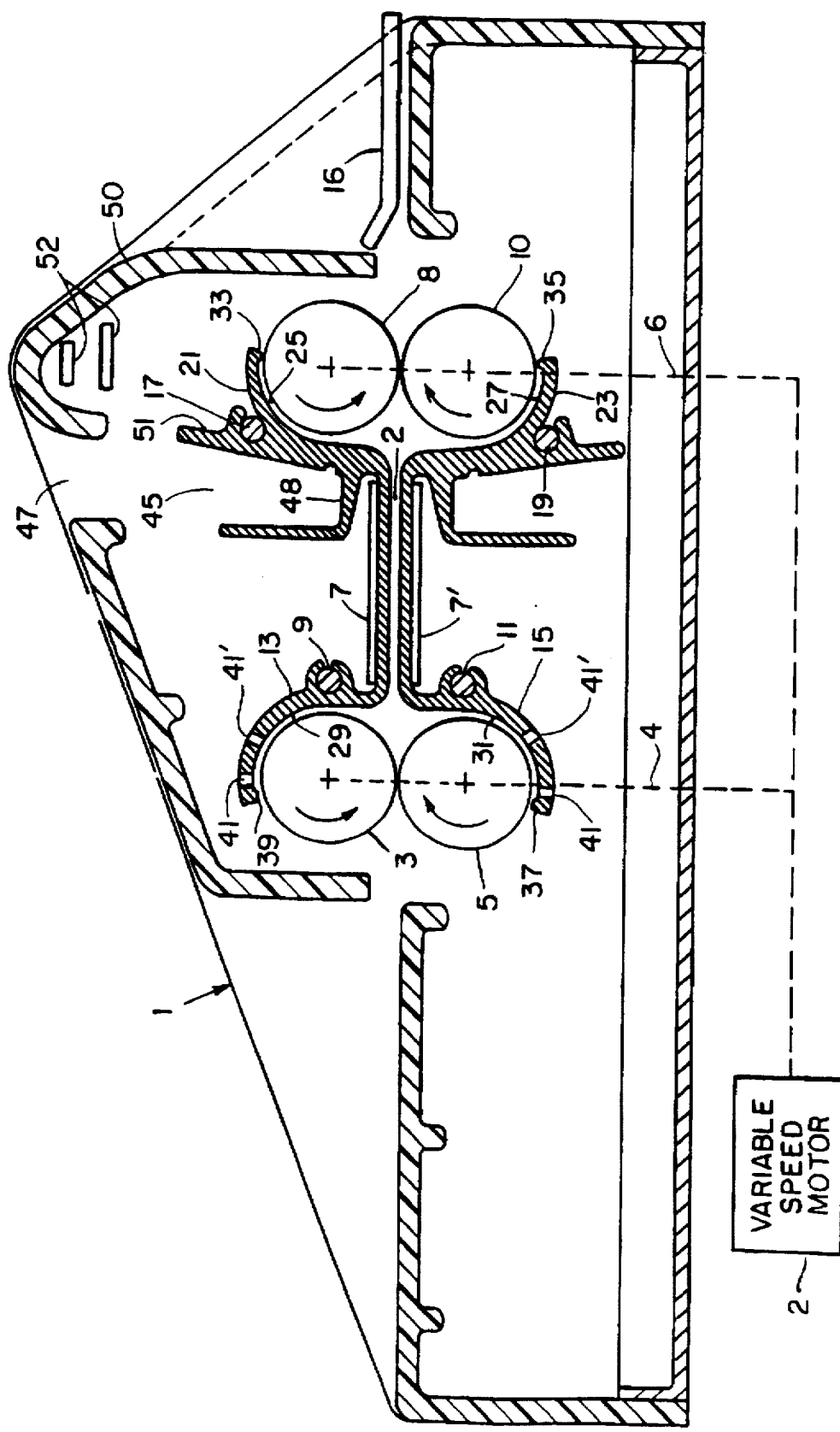
FIG. 1 is a side view of the preferred embodiment of the invention.

A first pair of rollers 3 and 5, within laminator casing 1, are used to support the envelopes while they are driven through the gap formed between the heater platens 7 and 7'. The leading edges of the now-heated envelopes thereafter pass through the nip of the second roller pair 8 and 10 which apply additional heat and pressure to produce a laminated product cooled by cooling member 16 at the exit portion of the laminator.

The heater means includes platens 7 and 7' which employ conventional electrical resistance wiring such as nichrome for heating the platens. This heater is far lighter than the two central heaters of the prior art which typically comprise two one pound aluminum heater blocks. A first heater portion 13 includes a thin arcuate extrusion of a good heat conductor such as aluminum, and is positioned adjacent to a first roller 3. A gap of about ten mils or less is present between the roller and first heater portion 13. Heat flows from heater platen 7 through the first heater portion 13, across the thin gap 29 and into the roller 3 which could be made of silicone rubber having a low heat conductivity, since only the peripheral portion of the roller need be heated. The second roller 5 may have a similar arrangement which includes lower heater portion 15 and gap 31 as shown.

A second heater portion 21 is also formed as a thin arcuate extrusion and is positioned adjacent a third roller 8 as shown. Thin arcuate gap. 25 like gap 29, permits substantial heat to flow into the peripheral surface portions of roller 8. A similar arrangement comprises lower roller 10, and gap 27 which may be formed between lower heater portion 23, and the roller 10.

Figure 2:
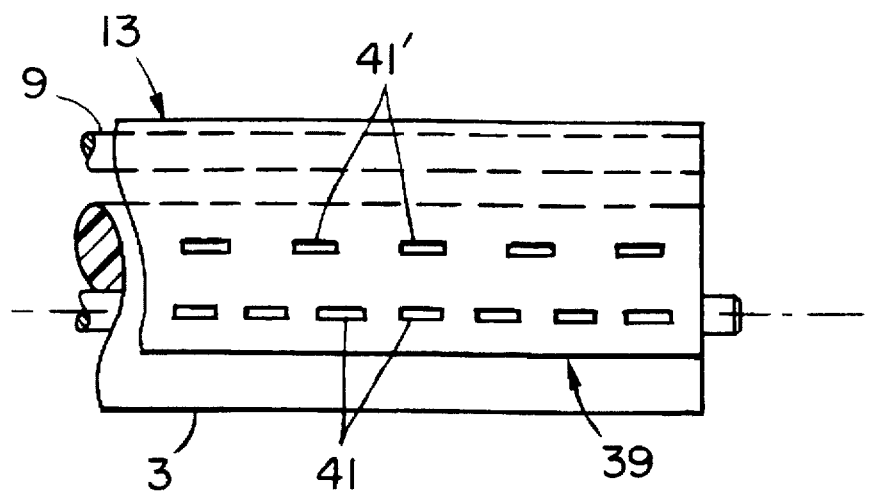
FIG. 2 is a partial plan view of FIG. 1.
Figure 3:
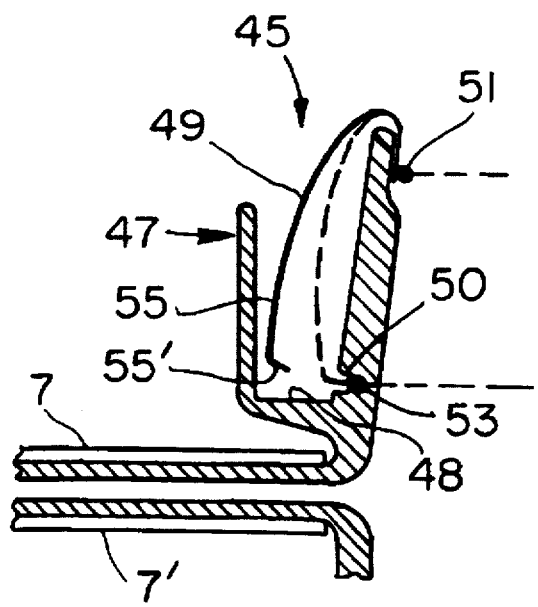
FIG. 3 illustrates the notch and microswitch bow-spring for receiving the perfect binder.

The first arcuate heater portion 13 is provided to preheat the pouches passing through the entrance rollers 3 and 5 in order to substantially reduce thermal shock (very abrupt heating) and the resulting interior gas bubbles which tend to be produced from photos and printed indicia by such thermal shock. In our design, the entrance roller temperature is about 225 degrees F. The second arcuate heater portion 21 keeps the exit roller pair at an elevated temperature which tends to reduce wrinkling and smooths out the lamination process, so that the wrinkles are "ironed out" more effectively. A warm roller will be softer and more compliant than a cooler one, which increases the contact area of the rollers within the roller bite. In our design, The widths of the first and second arcuate heater portions 13 and 21 respectively, extend along the entire length of the rollers. The first heater portion 13 is illustrated in FIG. 2 as extending along the length of the first roller 3, it being understood that the second heater portion 21 extends along the length of roller 8 in like manner. If third and fourth lower heater portions 15 and 23 are provided, they would also extend along the length of lower second and fourth rollers 5 and 10 respectively.

The first heater portion 13 has an inwardly extending finger member 39 while the second heater portion 21 has a like member 33. These finger members extend along the entire length of the roller. See FIG. 2 illustrating finger member 39. Similar finger members 35 and 37 may be provided at lower heater portions. These members serve to remove any residual previously melted plastic adhesive from the roller surfaces. They may contact the rollers or be slightly separated therefrom.

It is desirable to be able to adjust the position of the finger members all the way along the length of the rollers. This may be readily accomplished by utilizing ductile metal, such as ductile aluminum, for the arcuate heater portions, and forming slots 41 adjacent the finger members. A screw driver or similar tool is inserted into the slots and turned to bend the finger portions upwardly or downwardly to change the finger gap. A second row of slots 41' may be formed as shown in FIG. 2 for enabling bending of heater portions away from the finger member 39 to enlarge or diminish the gap 29. This would provide a means for controlling the effective temperature at the heat activatable adhesive. For example, to reduce the temperature at the adhesive, heater portion 13 could be bent upwardly along the entire length thereof by inserting the screw driver into slots 41'. This would increase the width of the insulating air gap 29, to increase thermal impedance, to in turn decrease the flow rate of heat into roller 3. Similar slots 41, 41' could be formed in the lower heater portion 15. Increasing the gap in this way may also be useful for cleaning the rollers.

The aforesaid notch 45 formed in the upper first heater portion 21, normally along its full width, receives a bundle of sheets, passed through slot 47, to be bound together by the application of heat to a conventional U-shaped perfect binding strip contacting leading edge portions of the sheets. A commonplace example of an edge or perfect bind is the top edge portions of a pad of lined paper, wherein the top edges thereof are "glued" to a binder strip perpendicular to the faces of the sheets. The leading edges of the bundle of sheets (five to one hundred sheets) are inserted into slot 45 via opening 27 and rest against bottom portion 48. Heated bow spring 49, also extending across the full width of the heater platen, is displaced to the right to a degree proportional to the number of sheets in the bundle. The result is that the bundle is snugly positioned within the slot, even though the number of sheets being perfect bound vary, and the edge portions of the sheets are tightly bound together after the heat-activatable adhesive of the binder strip is melted and thereafter cooled. In our notch design, in contrast with the design of others, both sides and the bottom of the U-shaped binding strip are heated to produce a good bond.

Optionally, the bow spring 49 may also function as a resilient switch for initiating operation of a timer which produces an alarm indication after the passage of the appropriate time period for performing the perfect edge binding step. The upper portion of the bow spring 49 is connected to contact 51 and the lower portion of the spring 55 with a bent tip 55' is positioned adjacent contact 53 as shown. After insertion of the bundle of sheets, tip portion 55' of the spring will press against contact 53 to close the switch and thus initiate actuation of the timer. A cavity 50 is provided to prevent snagging of the lower portion of the spring 55.

It is desired to eliminate the need for a cooling fan to cool the electronic control circuits. This is accomplished by forming a dome 50 above the heating components and forming air passage slots 52 therein as shown in FIG. 1. The dome, besides being a portion of the casing for enclosing the laminator components, also now functions as a chimney for convection cooling of the electronic control circuits without the need for a cooling fan. In one of our models, entrance orfice 47 is absent since there is no provision for perfect binding. However, even when slot 47 is present, it is often blocked by the sheets inserted therein being bound, so that hot air will exit through slots 52 to provide the desired cooling without a fan.

As explained hereinabove, the previously discussed time wasting and thus labor wasting "cool-down" interval of up to forty minutes, required to produce good laminations in accordance with currently marketed pouch (envelope) laminators, is eliminated by now driving the rollers at a high angular velocity just before lamination of the second batch of envelopes, which require a substantially lower temperature for lamination relative to the first batch previously laminated. The reduced dwell time within the laminator, of the envelopes of the second batch due to the now higher angular roller velocity, will prevent the heat-activatable adhesive from over heating to spoil the laminations of the second batch. As a result, the second batch may be immediately laminated after the first batch rather than waiting for the cooling down of the typical prior art high mass heater positioned between the entrance and exit roller pairs. This is accomplished by means of a conventional variable speed motor 2 which drives the two roller pairs via drive mechanisms schematically indicated by dashed lines 4 and 6 in FIG. 2.

After completion of lamination of the second batch of envelopes, a third batch requiring a higher effective temperature of lamination may be laminated in short order merely by decreasing the angular velocity of the rollers to in turn increase the dwell time of the pouches as they pass through the rollers. Thus the effective temperature cooldown time lag is essentially zero seconds.

As to the heat-up time lag. The high mass heater shoe of the usual type of prior art pouch laminators positioned between the entrance and exit roller pair has a far higher heat storage capacity, requiring a higher energy input, and a high degree of thermal inertia which is responsible for the aforesaid cool down problem. As a result, the time to attain the desired laminating temperatures is greater. Our machine designed in accordance with the major features of the present invention has a warm up time from room temperature to 275 degrees F. of about 1.25 minutes and a warm-up time to 375 degrees F. of 1.75 minutes. A typical prior art pouch laminator model LB-12, marketed by "Banner American" Inc., has corresponding warm-up times of three and four minutes. As a result, operators normally just leave the machine heated up all day long rather than having to put up with a long warm-up waiting period after turning the laminator off. In contrast, laminators made in accordance with the present invention have a shorter warm-up period which tends to alleviate this problem to save substantial amounts of electrical power.

Furthermore, the cool-down time from a given effective laminating temperature to room temperature of 70 degrees F. is as follows for the aforesaid prior art laminator: forty-one minutes from 375 degrees F.; thirty-five minutes from 325 degrees F.; twenty-five minutes from 225 degrees F. In sharp contrast, the cool-down times for our machine are a couple of seconds, over a wide range of effective temperatures from 325 degrees F. to 225 degrees F. This is because we employ changes in roller speed and hence the dwell time as explained previously, to change the effective laminating temperature in the heat-activatable adhesives within the plastic pouches or envelopes. Our low thermal mass heater device stays at a constant temperature of 325 degrees F. plus or minus about 2% With our one inch diameter silicone rubber rollers, having a length of about 12inches we attain an effective temperature of 375 degrees F. by causing the variable speed motor 2 to drive all four rollers at 8.7 RPM. To get effective temperatures of 325, 275, 225 and 200 degrees F. we drive the rollers at 10.2, 12.0, 14.7 and 16.5 RPMs respectively. This solves the aforesaid problem of rapidly laminating different batches of precut envelopes (pouches) having different effective temperature requirements. To our knowledge, this has never been done in precut pouch or envelope laminators. However, in contrast with precut pouch laminators, roll laminators laminate large numbers of inserts between continuous sheets of non-precut plastic fed from two rolls of plastic. After an entire run is completed, it is known to change the feed speed for a thicker or thinner plastic. This however does not involve the problem solved by the present invention of instant changeover of effective temperatures where a variety of precut unitized plastic pouches are mixed for lamination.

In the laminator design of the present invention, we do not need to change the temperature of the heater means regardless of varying effective temperature requirements. The central heater portions 7 and 7' are kept, at 325 degrees F., plus or minus 2%, which produces a constant temperature of about 280 degrees F. at the aforesaid binding slot 45. The beneficial effect of this constant temperature is that the aforesaid perfect binder timing interval, when the sheets are inserted into the slot 45, will be reliable, and the perfect binding will not overheat. Overheating of the heat-activatable perfect binder strip can cause the hot melt adhesive to run out of the binder receptor slot 45 into the laminator interior, resulting in a mess.

Lastly, elongated rods 9, 11, 17 and 19 which fit within the heater portions as shown in FIG. 2, can be screwed into side wall portions of the casing and thus function to support the heater portions. They are thus readily removable from the casing to enable disassembly of the components for maintenance purposes.

Numerous variations in the specific embodiment described will be readily apparent to the worker in the art, and thus the scope of the invention is to be defined by the terms of the following claims and art recognized equivalents thereof.

We claim:

1. A laminator for laminating precut items by the application of heat and pressure thereto comprising:
   (a) roller means for applying heat and pressure to the precut items to be laminated therebetween, said roller means having a contacting portion and a non-contacting portion with respect to the precut items;
   (b) a channel for feeding the precut items between said roller means; and
   (c) heater means disposed along a length of said channel including a platen terminating in at least one thin arcuate member disposed closely adjacent to and at least partially about said roller means and extending along the length of a substantial portion of said roller means and bent away from said channel and disposed about the non-contacting portion of said roller means for injecting heat into said roller means, said arcuate member terminating in an inwardly extending finger member for removing residual, previously melted plastic adhesive from said roller means.

2. The laminator of claim 1 wherein said arcuate member is positioned closely adjacent to the non-contacting portion of said roller means but in non-contacting relationship therewith defining a separation gap therebetween.

3. The laminator of claim 2 wherein said gap has a width of ten mils or less.

4. The laminator of claim 1 wherein said heater means further includes a thin walled notch for receiving a heat activatable perfect binder.

5. The laminator of claim 4 wherein the notch includes a heated resilient bow spring therein for causing the sheets being bound to be squeezed together within the notch, to enhance the perfect binding thereof.

6. The laminator of claim 1 wherein a chimney in the form of a dome, and having air passage slots therein, is positioned above the heater means for enabling convection cooling of heater related electronic components within the laminator without the need for a cooling fan.

7. The laminator of claim 2 wherein the thin arcuate member is made of a ductile metal, thereby enabling adjustment of the separation gap between the arcuate fin member and the roller means.

8. The laminator of claim 7 wherein several slots are formed within the arcuate member for receiving a tool for readily adjusting the separation gap along the width of the arcuate member.

9. The laminator of claim 1 in which said roller means includes at least first and second rollers.

10. The laminator of claim 9 in which there is one arcuate member disposed proximate the non-contacting portion of each said roller.

11. The laminator of claim 1 in which said roller means includes first and second rollers and third and fourth rollers separated from said first and second rollers.

12. The laminator of claim 4 in which there is at least one arcuate member disposed proximate the non-contacting portion of one of said first and second rollers and one arcuate member disposed proximate the non-contacting portion of one of said third and fourth rollers.

13. The laminator of claim 12 in which there is one arcuate member disposed proximate each said roller.

14. A laminator comprising:

a channel for receiving items to be laminated;

rollers disposed about said channel for applying heat and pressure to the items to be laminated as they pass through the channel in-between said rollers;

heater means disposed along a length of said channel including a platen terminating in thin arcuate members positioned closely adjacent to the rollers; and a slot for receiving items to be bound without passing through the rollers, and said heater means further including a thin walled notch at the terminal portion of said slot for heating said items to be bound.

15. The laminator of claim 14 in which said thin arcuate members extend at least partially about said rollers.

16. The laminator of claim 14 in which said notch extends adjacently from one of said thin arcuate members.

* * * * *